United States Patent
Yokota

(10) Patent No.: US 8,905,181 B2
(45) Date of Patent: Dec. 9, 2014

(54) MOTORCYCLE INTERNAL COMBUSTION ENGINE

(71) Applicant: Honda Motor Co., Ltd., Tokyo (JP)

(72) Inventor: Hiroshi Yokota, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/971,243

(22) Filed: Aug. 20, 2013

(65) Prior Publication Data

US 2014/0083789 A1  Mar. 27, 2014

(30) Foreign Application Priority Data

Sep. 27, 2012  (JP) ................... 2012-213999

(51) Int. Cl.
| | |
|---|---|
| *B60K 1/00* | (2006.01) |
| *F01M 11/00* | (2006.01) |
| *B62K 11/04* | (2006.01) |
| *F01M 11/03* | (2006.01) |

(52) U.S. Cl.
CPC .............. *B62K 11/04* (2013.01); *F01M 11/00* (2013.01); *F01M 2011/031* (2013.01); *F01M 11/03* (2013.01)
USPC ............ 180/291; 180/294; 180/296; 180/298

(58) Field of Classification Search
CPC ............ B60K 17/24; B60K 1/00; B60K 6/00; B60K 5/00
USPC ......... 180/291, 219, 297, 218, 309, 296, 298, 180/294
See application file for complete search history.

(56) References Cited

U.S. PATENT DOCUMENTS

| | | | |
|---|---|---|---|
| 6,290,017 B1* | 9/2001 | Ito ................................ | 180/219 |
| 6,591,934 B2* | 7/2003 | Tsutsumikoshi ............. | 180/291 |
| 7,232,142 B2* | 6/2007 | Kudo ............................ | 180/219 |
| 7,644,796 B2* | 1/2010 | Taniguchi ..................... | 180/219 |
| 8,002,653 B2* | 8/2011 | Shiozaki et al. .............. | 180/201 |
| 8,028,669 B2* | 10/2011 | Shiozaki et al. ........... | 123/195 R |
| 8,104,565 B2* | 1/2012 | Miyashiro et al. ............ | 180/219 |
| 8,130,500 B2* | 3/2012 | Oda ............................. | 361/710 |
| 8,210,302 B2* | 7/2012 | Mori et al. .................. | 180/69.4 |
| 8,245,588 B2* | 8/2012 | Ogasawara et al. ............ | 74/335 |
| 8,245,674 B2* | 8/2012 | Maehara et al. ........... | 123/90.11 |
| 8,381,679 B2* | 2/2013 | Idensjo ...................... | 119/14.02 |
| 2004/0200658 A1* | 10/2004 | Kawakubo et al. ........... | 180/309 |
| 2007/0251229 A1* | 11/2007 | Nakatsuka et al. ............. | 60/435 |
| 2008/0242497 A1* | 10/2008 | Nakano et al. ................. | 476/10 |
| 2010/0242914 A1* | 9/2010 | Negoro et al. ................ | 123/445 |

FOREIGN PATENT DOCUMENTS

JP  3547108 B2  7/2004

* cited by examiner

*Primary Examiner* — Hau Phan
(74) *Attorney, Agent, or Firm* — Birch, Stewart, Kolasch & Birch, LLP

(57) ABSTRACT

A motorcycle internal combustion engine including engine hangers capable of reducing the size of the internal combustion engine in an up-down direction. A motorcycle internal combustion engine includes a crankcase of the internal combustion engine with an oil filter attached to a front face thereof. Engine hangers are formed integrally with the crankcase on the front face thereof with each having a hanger boss configured to be fastened to a vehicle body frame of a motorcycle from a vehicle left-right direction. The engine hangers are formed to be distributed on left and right sides on the front face of the crankcase. The oil filter is arranged between the left and right engine hangers with the engine hangers and the oil filter overlapping each other in a vehicle side view.

20 Claims, 6 Drawing Sheets

MOTORCYCLE INTERNAL COMBUSTION ENGINE

CROSS-REFERENCE TO RELATED APPLICATIONS

The present application claims priority under 35 USC 119 to Japanese Patent Application No. 2012-213999 filed Sep. 27, 2012 the entire contents of which are hereby incorporated by reference.

BACKGROUND OF THE INVENTION

1. Field of the Invention

The present invention relates to a motorcycle internal combustion engine including engine hangers capable of making the internal combustion engine compact.

2. Description of Background Art

Japanese Patent No. 3547108 discloses an internal combustion engine to be mounted on a motorcycle in which an engine hanger and an oil filter are arranged on the front face of the crankcase.

In the internal combustion engine shown in Japanese Patent No. 3547108 (FIGS. 1 and 3), since the oil filter is arranged not to interfere with parts therearound and the engine hanger is arranged at a center front face of the crankcase, the height of the internal combustion engine in the up-down direction tends to increase.

However, in an internal combustion engine mounted particularly on a motorcycle, there is a large demand for an internal combustion engine made compact in the up-down direction.

SUMMARY AND OBJECTS OF THE INVENTION

The present invention has been made in view of the conventional art described above and an object of an embodiment of the present invention is to provide a motorcycle internal combustion engine including engine hangers capable of reducing the size of the internal combustion engine in the up-down direction.

For the purpose of solving the above-mentioned problems, according to an embodiment of the present invention a motorcycle internal combustion engine includes a crankcase of the internal combustion engine on a front face of which an oil filter is attached. Engine hangers are formed integrally with the crankcase on the front face thereof and each having a hanger boss configured to be fastened to a vehicle body frame of a motorcycle from a vehicle left-right direction. In the motorcycle internal combustion engine, the engine hangers are formed to be distributed on left and right sides on the front face of the crankcase, the oil filter is arranged between the left and right engine hangers, and the engine hangers and the oil filter overlap each other in a vehicle side view.

According to an embodiment of the present invention, the oil filter is arranged to be offset to one side in a width direction of the internal combustion engine. An avoiding portion having a shape along an outer edge of the oil filter is formed in one of the left and right engine hangers which is closer to the oil filter.

According to an embodiment of the present invention, the oil filter has a tubular shape, and the avoiding portion of the one engine hanger forms a recessed portion having an arc-shape in a cross section.

According to an embodiment of the present invention, the crankcase has an upper-lower divided structure including an upper crankcase and a lower crankcase with the engine hangers and the oil filter are disposed on the lower crankcase. A starter motor is attached to the front of the upper crankcase.

According to an embodiment of the present invention, in the vehicle body frame of the motorcycle, a down tube extends downwardly toward the rear at a steep angle from a head pipe, and a pair of left and right lower frames extend from a lower end portion of the down tube in a branched manner and are curve rearwardly. The left and right engine hangers are fastened to the lower frames with bolts from outer sides and the lower frames and are arranged to overlap the oil filter in the vehicle side view. The oil filter is configured to be open on a front side through a space between the paired left and right lower arms.

According to an embodiment of the present invention, the down tube is located on a vehicle front side of the starter motor and overlaps the starter motor in a vehicle front view.

According to an embodiment of the present invention, a cylinder block is formed integrally with the upper crankcase, the engine hangers are formed on the lower crankcase, and a second engine hanger is formed on a front face of the cylinder block and coupled to the down tube with a bolt.

According to an embodiment of the present invention, since the oil filter and the engine hangers are arranged to overlap each other in the vehicle side view, the size of the internal combustion engine can be made compact in the height direction.

According to an embodiment of the present invention, since the avoiding portion having the shape along the outer edge of the oil filter is formed in the engine hanger, the size of the internal combustion engine can be made compact in the width direction.

According to an embodiment of the present invention, since the avoiding portion of the engine hanger forms a recessed portion having the arc-shape in a cross section, an outer surface of the engine hanger is formed smooth and the stiffness is secured.

According to an embodiment of the present invention, since the oil filter is disposed on the lower crankcase and the starter motor is disposed on the upper crankcase, the starter motor and the oil filter can be disposed to overlap each other as viewed from the bottom of the vehicle. Accordingly, the size of the internal combustion engine can be made compact in the width direction.

According to an embodiment of the present invention, the oil filter is protected on the vehicle lateral sides by the left and right lower frames. Moreover, since the oil filter is configured to be open to a front space the replacement work with regard to the oil filter is facilitated.

According to an embodiment of the present invention, the down tube located on the vehicle front side can protect the starter motor from pebbles thrown up by a front wheel.

According to an embodiment of the present invention, supporting portions of the internal combustion engine are provided in a triangle with three engine hangers of the left and right engine hanger and the second engine hanger located respectively at vertices of the triangle in the vehicle front view. Accordingly, this contributes to further stabilization of the support of the internal combustion engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
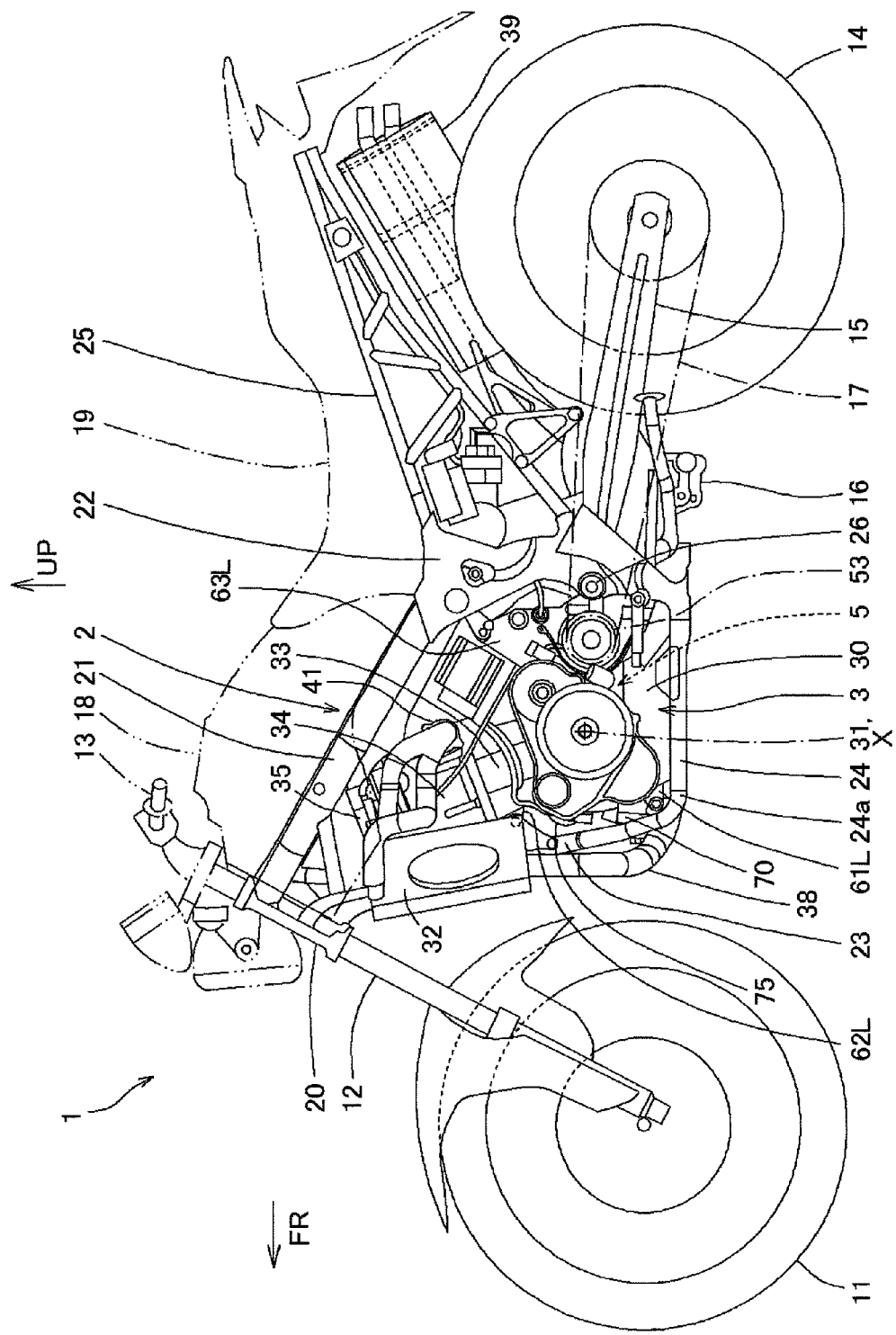
FIG. 1 is a left-side view of a motorcycle on which a motorcycle internal combustion engine of one embodiment of the present invention is mounted with covers and the like of the motorcycle being removed.

A description is given of a motorcycle internal combustion engine of one embodiment of the present invention, on the basis of FIGS. 1 to 6.

Directions such as front, rear, left, right, up, and down in the explanation of the description and the scope of claims are assumed to be based on the directions of the vehicle (motorcycle) with the motorcycle internal combustion engine (hereafter, simply referred to as "internal combustion engine") of the embodiment mounted on the motorcycle.

In the drawings, the arrow FR indicates a vehicle forward direction, the arrow LH indicates a vehicle leftward direction, the arrow RH indicates a vehicle rightward direction, and the arrow UP indicates a vehicle upward direction.

FIG. 1 is a side view of a motorcycle 1 in one embodiment of the present invention wherein covers and the like are removed. A vehicle body frame 2 of the motorcycle 1 includes a head pipe 20; paired left and right main frames 21 which extend obliquely rearwardly from the head pipe 20; paired left and right center frames 22 which extend downwardly from rear ends of the main frames 21; one down tube 23 which extends downwardly toward the rear from the head pipe 20 at an steep angle; paired left and right lower frames 24 which are connected to a lower end of the down tube 23, extend downwardly obliquely to the left and right in a branched manner, then extend rearwardly substantially horizontally through curved portions 24a, and are connected to lower ends of the paired left and right center frames 22; and seat stays 25 which extend rearwardly and slightly upwardly from upper and lower portions of the center frames 22.

A front fork 12 supporting a front wheel 11 is steerably supported on the head pipe 20 and a steering handle 13 is coupled to the front fork 12. A rear fork 15 supporting a rear wheel 14 is supported to be vertically swingable with a pivot portion 26 in the lower portions of the center frames 22 being the fulcrum. A shock absorber unit not illustrated is provided between the upper portions of the center frames 22 and the rear fork 15 via a link mechanism 16.

An internal combustion engine 3 of the embodiment is a water-cooled four-stroke-cycle internal combustion engine with two cylinders arranged in line which integrally includes a transmission 5 in a rear portion of a crankcase 30 of the internal combustion engine 3 to form a so-called "power unit." The power unit is mounted on the motorcycle 1 in such a way that a crankshaft 31 is arranged with an axis X thereof extending in a vehicle width direction of the motorcycle 1, i.e., in a left-right direction.

The internal combustion engine 3 is supported by the down tube 23, the lower frames 24, and the center frames 22. The drive force of the internal combustion engine 3 is transmitted to the rear wheel 14 via the transmission 5 built into the internal combustion engine 3 and a rear wheel drive chain 17. A fuel tank 18 is mounted on the left and right main frames 21 at a position above the internal combustion engine 3, a tandem seat 19 for a driver and a passenger is attached onto the center frames 22 and the seat stays 25, and a radiator 32 is disposed in front of the internal combustion engine 3.

Figure 2:
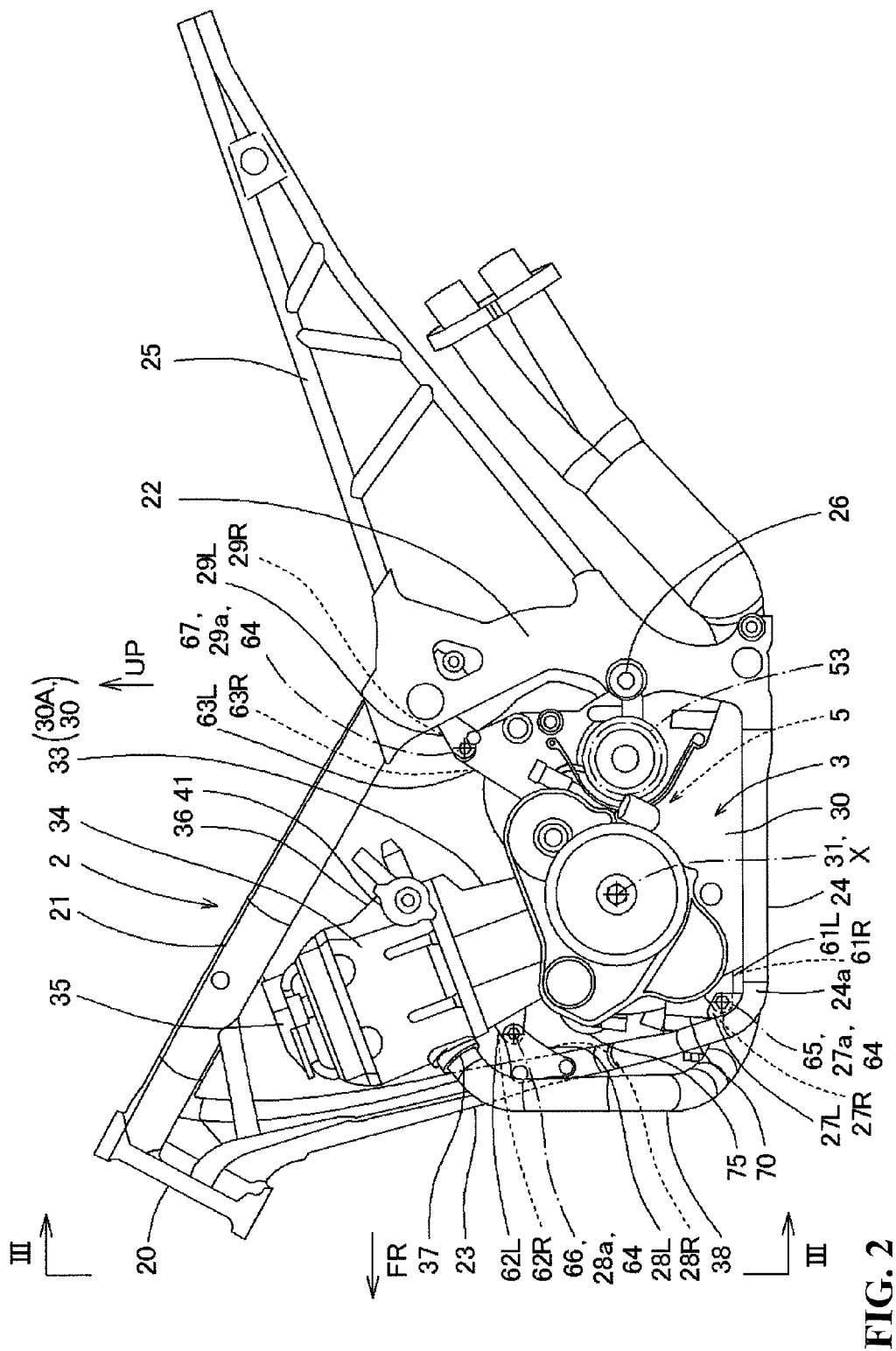
FIG. 2 is a left-side view of a vehicle body frame and the motorcycle internal combustion engine in the motorcycle of FIG. 1.

FIG. 2 shows a left-side view of the vehicle body frame 2 and the internal combustion engine 3 in the motorcycle 1.

As shown in FIG. 2, in the internal combustion engine 3, a cylinder block 33 is formed integrally with a front upper portion of the crankcase 30 to slightly incline to the front, a cylinder head 34 is fastened to an upper portion of the cylinder block 33, and a cylinder head cover 35 fastened to an upper portion of the cylinder head 34 covers the cylinder head 34.

In the cylinder block 33, two cylinder bores not illustrated are arranged in a vehicle body width direction with cylinder axes Y thereof inclined to the front. Pistons which are not illustrated and which are slidably fitted into the respective cylinder bores are connected to the crankshaft 31 arranged to extend in the vehicle width direction, via connecting rods.

An intake system not illustrated is connected behind intake ports 36 in a rear portion of the cylinder head 34 while an exhaust pipe 38 is connected to exhaust ports 37 in a front portion of the cylinder head 34. The exhaust pipe 38 runs on a right side of a lower portion of the crankcase 30 and is connected to a muffler 39 (see FIG. 1) disposed on a right upper side of the rear wheel 13.

As shown in FIG. 2, the internal combustion engine 3 includes a left engine hanger ("engine hanger" of the present invention) 61L and a right engine hanger ("engine hanger" of the present invention) 61R which are formed integrally with the crankcase 30 and which are distributed on left and right sides to protrude forward from a front face of a lower front portion of the crankcase 30; a left second engine hanger ("second engine hanger" of the present invention) 62L and a right second engine hanger ("second engine hanger" of the present invention) 62R which are formed integrally with the crankcase 30 and protrude forward from a front face of the front upper portion of the crankcase 30, i.e. a front upper portion of the cylinder block 33; and a left third engine hanger 63L and a right third engine hanger 63R which are formed integrally with the crankcase 30 and which protrude upwardly to the right and left from a rear upper portion of the crankcase 30.

Figure 4:
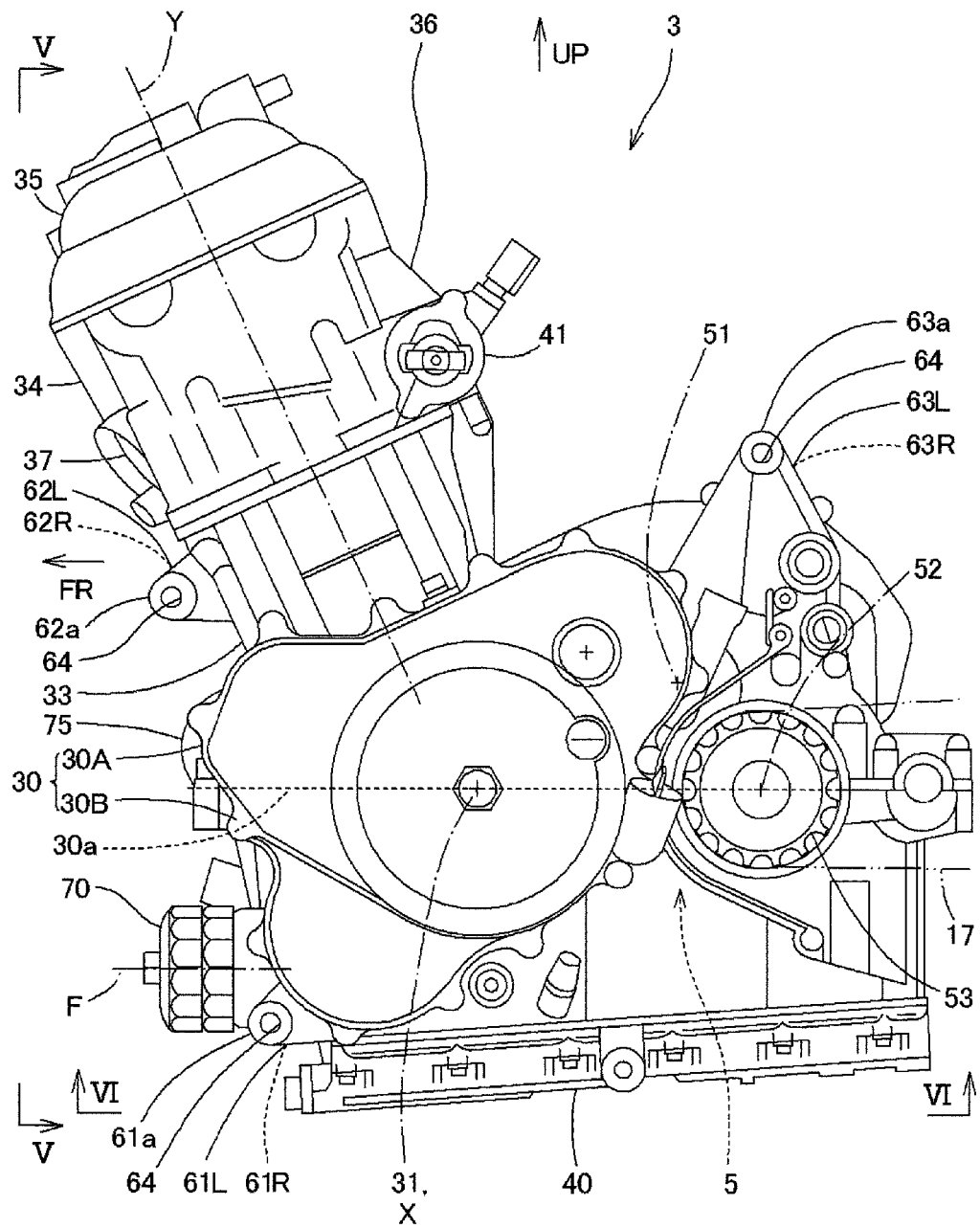
FIG. 4 is a left-side view of the motorcycle internal combustion engine of the embodiment.

The engine hangers 61L, 61R, 62L, 62R, 63L, and 63R have, at front ends thereof, hanger bosses 61a, 62a, and 63a each including a fastening female screw hole 64 whose axis extends in the vehicle width direction (vehicle left-right direction) (see FIG. 4).

Meanwhile, a left hanger bracket 27L and a right hanger bracket 27R are welded and fixed to the vehicle body frame 2 in the curved portions 24a of the left and right lower frames 24. The left hanger bracket 27L and the right hanger bracket 27R extend toward inner sides of the curved portions 24a and each includes a flat surface parallel to the vehicle front-rear direction and to the up-down direction and a fastening hole 27a whose axis extends in the vehicle width direction (vehicle left-right direction).

A left second hanger bracket 28L and a right second hanger bracket 28R are fastened to a portion near the lower end of the down tube 23 on left and right sides thereof, the left second hanger bracket 28L and the right second hanger bracket 28R extending rearwardly and each includes a flat surface parallel to the vehicle front-rear direction and to the up-down direction and a fastening hole 28a whose axis extends in a vehicle width direction.

A left third hanger bracket 29L and a right third hanger bracket 29R are welded and fixed to upper portions of the left and right center frames, the left third hanger bracket 29L and the right third hanger bracket 29R extending forward and each including a flat surface parallel to the vehicle front-rear direction and to the up-down direction and a fastening hole 29a whose axis extends in a vehicle width direction.

The hanger bosses 61a respectively of the left and right engine hangers 61L, 61R are fastened to inner sides of the left and right hanger brackets 27L, 27R on the vehicle body frame 2 side with fastening bolts ("bolts" of the present invention) 65 from outer sides in the vehicle left-right direction.

The hanger bosses 62a respectively of the left and right second engine hangers 62L, 62R are fastened to inner sides of the left and right second hanger brackets 28L, 28R on the vehicle body frame 2 side with fastening bolts ("bolt" of the present invention) 66 from outer sides in the vehicle left-right direction.

The hanger bosses 63a respectively of the left and right third engine hangers 63L, 63R are fastened to inner sides of the left and right third hanger brackets 29L, 29R on the vehicle body frame 2 side with fastening bolts 67 from outer sides in the vehicle left-right direction.

The internal combustion engine 3 is thus mounted and fixed to the vehicle body frame 2.

Figure 3:
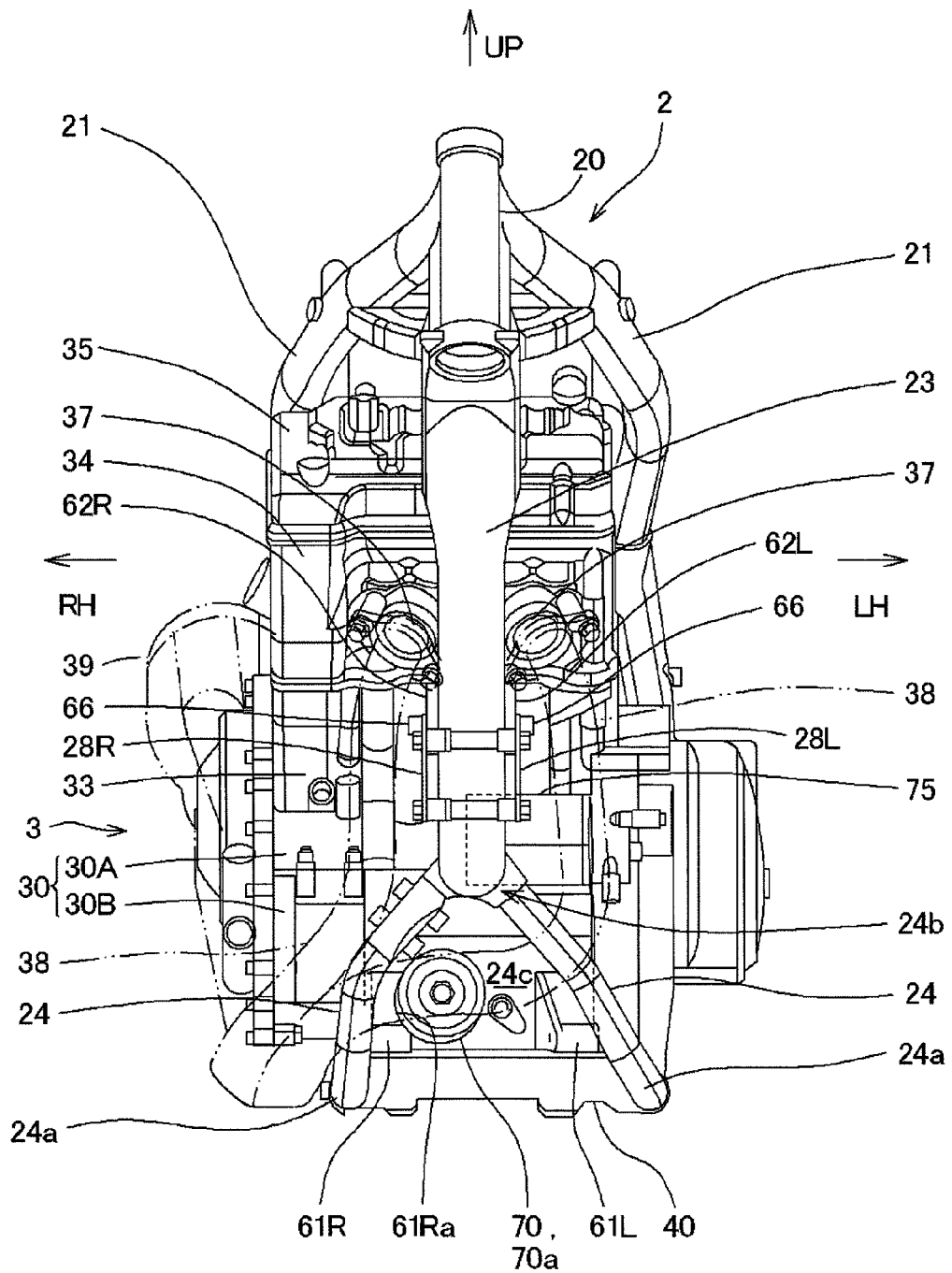
FIG. 3 is a front view of the vehicle body frame and the motorcycle internal combustion engine as viewed in a direction of the arrows III-III in FIG. 2.

As shown in FIG. 3 which is a view showing the state of FIG. 2 as viewed from the front of the vehicle, and referring also to FIG. 2, in the vehicle body frame 2 of the motorcycle 1, the down tube 23 extends downward toward the rear at a steep angle from the head pipe 20 and a pair of left and right the lower frames 24 extend from the lower end portion of the down tube 23 in a branched manner and curve to extend rearwardly. The left and right engine hangers 61L, 61R provided on the crankcase 30 to be distributed on the left and right sides at a relatively large interval in the vehicle width direction are fastened to the left and right hanger brackets 27L, 27R in the curved portions 24a of the lower frames 24, as two supporting points.

The left and right second engine hangers 62L, 62R are provided in the front upper portion of the cylinder block 33 of the crankcase 30 at a relatively small interval in the vehicle width direction. Both of the second engine hangers 62L, 62R are interposed between and fastened by the left and right second hanger brackets 28L, 28R near the lower end of the one down tube 23 as substantially one supporting point, the left and right second hanger brackets 28L, 28R sandwiching the down tube from the left and right and fastened thereto.

In summary, as viewed from the front of the vehicle, the left and right second engine hangers 62L, 62R form substantially one supporting point while left and right engine hangers 61L, 61R form two supporting points distributed on the left and right sides and being away from each other, at positions below and away from the second engine hangers 62L, 62R.

Moreover, portions of the exhaust pipe 38 connected to the left and right exhaust ports 37 extend downward in front of the down tube 23 and merge into one pipe below a branching portion 24b of the lower frames 24, on the vehicle right side. Then, the exhaust pipe 38 extends toward the rear of the vehicle to be connected to the muffler 39.

An oil filter 70 is disposed and attached (see FIGS. 1 and 2) to a front face lower portion of the crankcase 30 to be interposed between the left and right engine hangers 61L, 61R and to overlap the left and right engine hangers 61L, 61R in a vehicle side view.

Accordingly, in the internal combustion engine 3 of the embodiment, since the oil filter 70 and the left and right engine hangers 61L, 61R are disposed in the lower portion of the crankcase 30, the size of the internal combustion engine 3 can be made compact in the height direction.

Moreover, since the oil filter 70 is disposed to overlap the left and right lower frames 24 in the vehicle side view as shown in FIG. 2, the oil filter 70 is protected on vehicle lateral sides by the left and right lower frames 24.

Furthermore, as shown in FIG. 3, the oil filter 70 is located in an inter-lower-frame space 24c between the paired left and right lower frames 24 in the vehicle front view and is open on the front side through the inter-lower-frame space 24c. This facilitates access during maintenance such as the replacement of the oil filter 70 from the front.

A starter motor 75 is disposed and attached to a front face upper portion of the crankcase 30, on the vehicle rear side of the lower end of the down tube 23, to partially overlap a portion around the lower end of the down tube 23 in the vehicle front view.

FIG. 4 shows a left-side view of the internal combustion engine 3 of the embodiment. The crankcase 30 by which the crankshaft 31 is rotatably supported with the axis X thereof arranged in the vehicle width direction is formed to have an upper-lower divided structure which is divided into an upper part and a lower part at crankcase divided surfaces (hereafter, simply referred to as "divided surfaces") 30a on the crankshaft 31. An upper crankcase 30A and a lower crankcase 30B are integrally fastened to each other by using bolts with the divided surfaces 30a matched to each other.

In an upper portion of the upper crankcase 30A, the cylinder block 33 integrally formed with the two cylinder bores arranged in line and the cylinder head 34 fastened to the cylinder block 33 are stacked one on top of the other and stand with the cylinder axes Y slightly inclined to the front. A cylinder cover 35 is placed on the cylinder head 34 and fastened thereto.

An oil pan 40 is attached below the lower crankcase 30B.

In the crankcase 30, the crankshaft 31 is rotatably supported by being interposed between the divided surfaces 30a of the upper crankcase 30A and the lower crankcase 30B, and the transmission 5 is disposed in the crankcase 30 behind the crankshaft 31.

The transmission 5 is a constant-mesh gear transmission and a main shaft 51 of the transmission 5 parallel to the crankshaft 31 is rotatably supported in the upper crankcase 30A, at a position behind and on an oblique upper side of the crankshaft 31.

Moreover, a counter shaft 52 parallel to the crankshaft 31 is rotatably supported by being interposed between the divided surfaces 30a of the upper crankcase 30A and the lower crankcase 30B, behind the crankshaft 31 and the main shaft 51.

The counter shaft 52 is an output shaft of the internal combustion engine 3. A drive sprocket 53 is provided in a portion at a shaft end of the counter shaft 52 which protrudes from a left outer portion of the crankcase 30 and meshes with the rear wheel drive chain 17.

A water pump 40 is provided on a left surface of the cylinder head 34 and supplies cooling water to a water jacket of the cylinder block 33 and the cylinder head 34, which is not illustrated, to cool the internal combustion engine 3. The cooling water having passed through the water jacket is cooled in the radiator 32 shown in FIG. 1 and is then collected and circulated.

Figure 5:
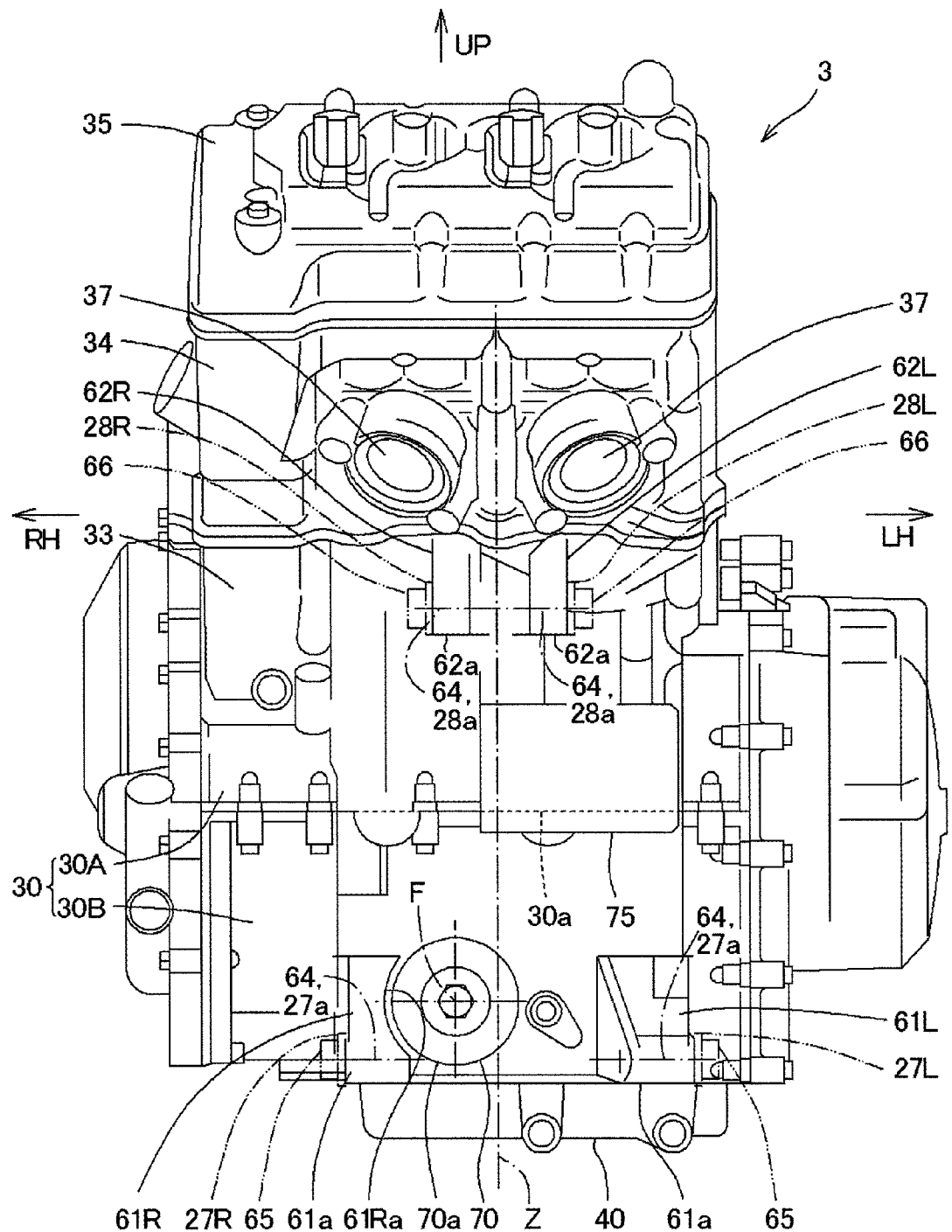
FIG. 5 is a front view of the motorcycle internal combustion engine as viewed in the direction of the arrows V-V in FIG. 4.

As shown in the vehicle front view of FIG. 5, the oil filter 70 is provided in the front face lower portion of the lower crankcase 30B to be interposed between the left and right engine hangers 61L, 61R as described above. The tubular oil filter 70 is disposed with the center line F thereof offset to the right side from the left-right center line Z of the internal combustion engine 3. An avoiding portion 61Ra having such a shape that a recessed portion having an arc-shape for cross section is formed along an tubular outer edge 70a of the oil filter 70 is formed in the right engine hanger 61R on the side close to the oil filter 70.

Accordingly, even when the oil filter 70 is provided to be offset and interposed between the left and right engine hangers 61L, 61R, the oil filter 70 and the right engine hanger 61R can be disposed close to each other without any problem because the avoiding portion 61Ra of the right engine hanger 61R close to the oil filter 70 has a shape along the outer edge 70a of the oil filter 70. Thus, the size of the internal combustion engine 3 is made compact in the width direction.

Moreover, since the avoiding portion 61Ra of the right engine hanger 61R is the recessed portion having the arc-shape for cross section, an outer surface thereof is formed to be smooth and the stiffness of the right engine hanger 61R is secured.

As shown in FIG. 5, the oil filter 70 is attached to the front face lower portion of the lower crankcase 30B and interposed between the left and right engine hangers 61L, 61R. Meanwhile, in front of the upper crankcase 30A of the crankcase 30, the starter motor 75 is disposed and attached to be offset to the left from the left-right center line Z of the internal combustion engine 3. The starter motor 75 is located at a position partially overlapping the oil filter 70 in the left-right direction.

In other words, arranging the starter motor 75 and the oil filter 70 away from each other on upper and lower sides eliminates restrictions in left-right positions between the two.

Figure 6:
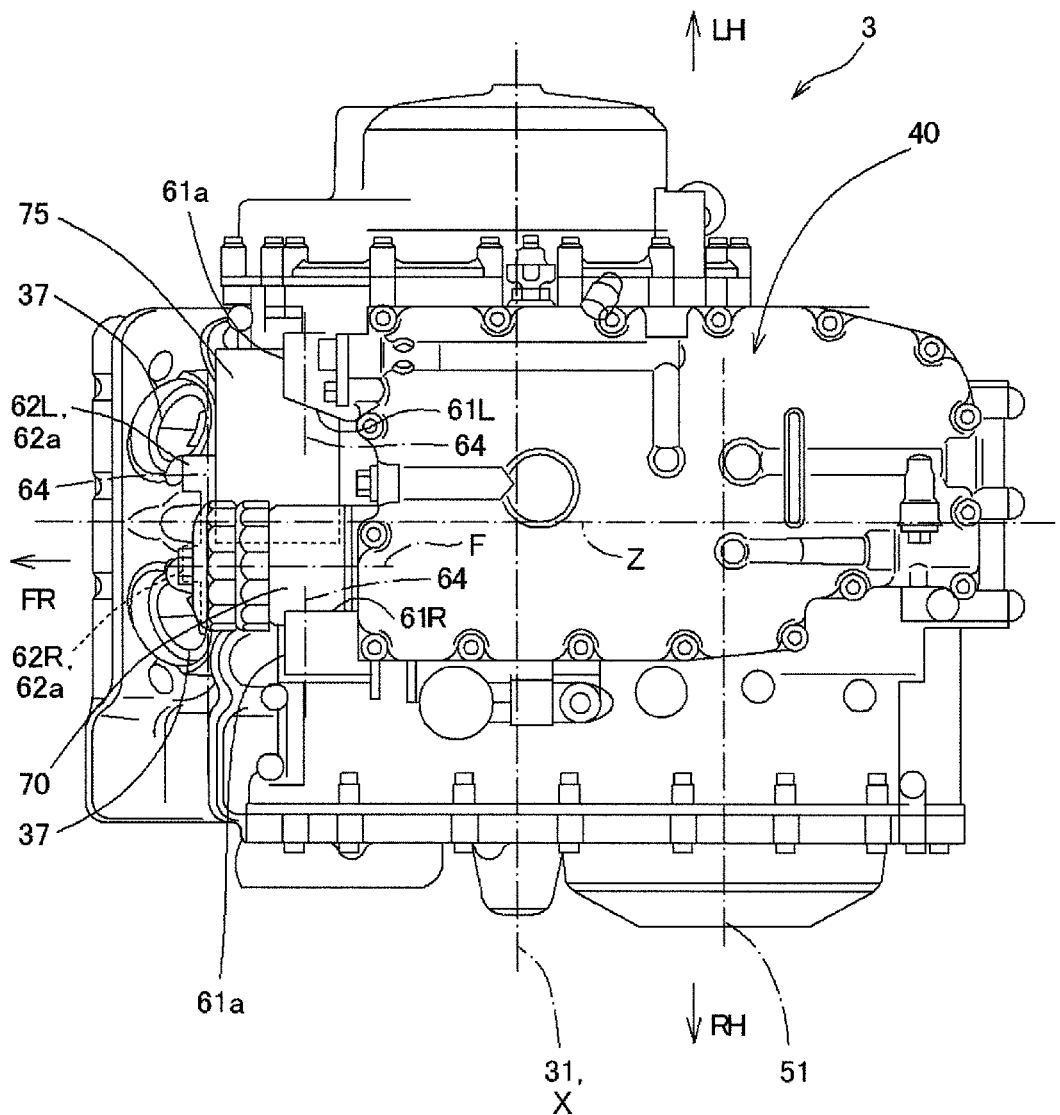
FIG. 6 is a bottom view of the motorcycle internal combustion engine as viewed in the direction of the arrows VI-VI in FIG. 4.

Accordingly, as shown in FIG. 6, the starter motor 75 and the oil filter 70 can be arranged to overlap each other in the width direction as viewed from the bottom of the vehicle, and the size of the internal combustion engine 3 can be made compact in the width direction.

As described in FIG. 3, the starter motor 75 is disposed and attached on the vehicle rear side of the portion near the lower end of the down tube 23 to partially overlap the lower end of the down tube 23 in the vehicle front view.

Since the down tube 23 is located on the vehicle front side of the starter motor 75 (see FIGS. 1 and 2) and overlaps the starter motor 75 in the vehicle front view, the down tube 23 located in front of the starter motor 75 can protect the starter motor 75 from pebbles thrown up by the front wheel 11.

In the embodiment, the cylinder block 33 is formed integrally with the upper crankcase 30A, the left and right engine hangers 61L, 61R are formed on the lower crankcase 30B, and the left and right second engine hangers 62L, 62R are formed in the front face upper portion of the cylinder block 33 and coupled to the left and right second hanger brackets 28L, 28R near the lower end of the one down tube 23 with the fastening bolts 67. Accordingly, as described with reference to FIG. 3, as viewed from the front of the vehicle, the left and right second engine hangers 62L, 62R form a substantially one supporting point for the crankcase 30 while the left and right engine hangers 61L, 61R form two supporting points for the crankcase 30 which are provided at positions below and away from the second engine hangers 62L, 62R and away from each other in the left-right direction.

Accordingly, suspending and supporting portions in the front portion of the internal combustion engine 3 are provided in a triangle with the three supporting points located at the vertices of the triangle as viewed from the front of the vehicle, and the support of the internal combustion engine 3 is thus made more stable.

Providing the left and right second engine hangers 62L, 62R in the front face upper portion of the cylinder block 33 as described above can be easily applied particularly to the water-cooled internal combustion engine 3 which requires no provision of cooling fins for air-cooling on the cylinder block 33 and is thus effective.

The embodiment of the present invention has been described above. However, the modes of the present invention are not limited to the above embodiment and include various embodiments within the scope of the present invention as a matter of course.

For example, the motorcycle internal combustion engine of the present invention is not limited to the one in the embodiment and may be any motorcycle internal combustion engine including the requirements of the claims. Moreover, the number of cylinders is not limited to that of the motorcycle internal combustion engine of the embodiment.

Furthermore, the present invention can be carried out similarly in a motorcycle internal combustion engine in which the left-right arrangement of the internal combustion engine is left-right reversed from that of the embodiment described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A motorcycle internal combustion engine includes a crankcase of the internal combustion engine with an oil filter being mounted on a front face thereof and engine hangers formed integrally with the crankcase on the front face thereof, each engine hanger having a hanger boss configured to be fastened to a vehicle body frame of a motorcycle from a vehicle left-right direction, comprising:
the engine hangers are formed to be distributed on left and right sides on the front face of the crankcase;
the oil filter is arranged to be offset to one side in a width direction of the internal combustion engine with the oil filter being positioned in alignment with and between the left and right engine hangers; and
the engine hangers and the oil filter overlap each other in a vehicle side view and one of the engine hangers includes an avoiding portion that is disposed directly adjacent to the oil filter and includes a recessed shape configured to conform to the shape of the oil filter for protecting the oil filter.

2. The motorcycle internal combustion engine according to claim 1, wherein the avoiding portion has the recessed shape along an outer edge of the oil filter that is formed in one of the left and right engine hangers located closer to the oil filter.

3. The motorcycle internal combustion engine according to claim 2, wherein the oil filter has a tubular shape; and the avoiding portion on one of the left and right engine hangers forms the recessed shape as an arc-shape in a cross section.

4. The motorcycle internal combustion engine according to claim 2, wherein:
the crankcase has an upper-lower divided structure includes an upper crankcase and a lower crankcase;
the engine hangers and the oil filter are disposed on the lower crankcase; and
a starter motor is attached to the front of the upper crankcase.

5. The motorcycle internal combustion engine according to claim 3, wherein:
the crankcase has an upper-lower divided structure includes an upper crankcase and a lower crankcase;
the engine hangers and the oil filter are disposed on the lower crankcase; and
a starter motor is attached to the front of the upper crankcase.

6. The motorcycle internal combustion engine according to claim 1, wherein:
the crankcase has an upper-lower divided structure includes an upper crankcase and a lower crankcase;
the engine hangers and the oil filter are disposed on the lower crankcase; and
a starter motor is attached to the front of the upper crankcase.

7. The motorcycle internal combustion engine according to claim 6, wherein:
in the vehicle body frame of the motorcycle, a down tube extends downwardly toward the rear at a steep angle from a head pipe, and a pair of left and right lower frames extend from a lower end portion of the down tube in a branched manner and curve rearwardly;
the left and right engine hangers are fastened to the lower frames with bolts from outer sides and the lower frames are arranged to overlap the oil filter in the vehicle side view; and
the oil filter is configured to be open on a front side through a space between the paired left and right lower arms.

8. The motorcycle internal combustion engine according to claim 7, wherein the down tube is located on a vehicle front side of the starter motor and overlaps the starter motor in a vehicle front view.

9. The motorcycle internal combustion engine according to claim 7, wherein:
a cylinder block is formed integrally with the upper crankcase;
the engine hangers are formed on the lower crankcase; and
a second engine hanger is formed on a front face of the cylinder block and coupled to the down tube with a bolt.

10. The motorcycle internal combustion engine according to claim 8, wherein:
a cylinder block is formed integrally with the upper crankcase;
the engine hangers are formed on the lower crankcase; and
a second engine hanger is formed on a front face of the cylinder block and coupled to the down tube with a bolt.

11. The motorcycle internal combustion engine according to claim 6, wherein:
a cylinder block is formed integrally with the upper crankcase;
the engine hangers are formed on the lower crankcase; and
a second engine hanger is formed on a front face of the cylinder block and coupled to the down tube with a bolt.

12. A motorcycle internal combustion engine comprising:
a crankcase;
an oil filter being mounted on a front face of the crankcase;
a left engine hangers formed integrally with the crankcase on the front face thereof;
a right engine hanger formed integrally with the crankcase on the front face thereof;
said left and right engine hangers having a hanger boss configured to be fastened to a vehicle body frame of a motorcycle from a vehicle left-right direction;
said oil filter being arranged to be offset to one side in a width direction of the internal combustion engine with the oil filter being positioned in alignment with and between the left and right engine hangers; and
said left and right engine hangers and the oil filter overlap each other in a vehicle side view and one of the engine hangers includes an avoiding portion that is disposed directly adjacent to the oil filter and includes a recessed shape configured to conform to the shape of the oil filter for protecting the oil filter.

13. The motorcycle internal combustion engine according to claim 12, wherein the avoiding portion has the recessed shape along an outer edge of the oil filter that is formed in one of the left and right engine hangers located closer to the oil filter.

14. The motorcycle internal combustion engine according to claim 13, wherein the oil filter has a tubular shape; and
the avoiding portion in one of the left and right engine hangers forms the recessed shape as an arc-shape in a cross section.

15. The motorcycle internal combustion engine according to claim 13, wherein:
the crankcase has an upper-lower divided structure includes an upper crankcase and a lower crankcase;
the engine hangers and the oil filter are disposed on the lower crankcase; and
a starter motor is attached to the front of the upper crankcase.

16. The motorcycle internal combustion engine according to claim 12, wherein:
the crankcase has an upper-lower divided structure includes an upper crankcase and a lower crankcase;
the engine hangers and the oil filter are disposed on the lower crankcase; and
a starter motor is attached to the front of the upper crankcase.

17. The motorcycle internal combustion engine according to claim 15, wherein:
in the vehicle body frame of the motorcycle, a down tube extends downwardly toward the rear at a steep angle from a head pipe, and a pair of left and right lower frames extend from a lower end portion of the down tube in a branched manner and curve rearwardly;
the left and right engine hangers are fastened to the lower frames with bolts from outer sides and the lower frames are arranged to overlap the oil filter in the vehicle side view; and
the oil filter is configured to be open on a front side through a space between the paired left and right lower arms.

18. The motorcycle internal combustion engine according to claim 17, wherein the down tube is located on a vehicle front side of the starter motor and overlaps the starter motor in a vehicle front view.

19. The motorcycle internal combustion engine according to claim 17, wherein:
a cylinder block is formed integrally with the upper crankcase;
the engine hangers are formed on the lower crankcase; and a second engine hanger is formed on a front face of the cylinder block and coupled to the down tube with a bolt.

20. The motorcycle internal combustion engine according to claim 16, wherein:
a cylinder block is formed integrally with the upper crankcase;
the engine hangers are formed on the lower crankcase; and
a second engine hanger is formed on a front face of the cylinder block and coupled to the down tube with a bolt.

* * * * *